(12) United States Patent
Bain (10) Patent No.: US 9,922,174 B2
(45) Date of Patent: Mar. 20, 2018

(54) SECURE DOCUMENT MANAGEMENT

(71) Applicant: Business Partners Limited, London (GB)

(72) Inventor: Simon Bain, Northumberland (GB)

(73) Assignee: Business Partners Limited, London (GB)

( * ) Notice: Subject to any disclaimer, the term of this patent is extended or adjusted under 35 U.S.C. 154(b) by 0 days.

(21) Appl. No.: 15/221,725

(22) Filed: Jul. 28, 2016

(65) Prior Publication Data

US 2016/0335420 A1 Nov. 17, 2016

Related U.S. Application Data

(63) Continuation of application No. PCT/GB2015/053661, filed on Nov. 30, 2015.

(30) Foreign Application Priority Data

Dec. 5, 2014 (GB) .................................. 1421672.5

(51) Int. Cl.
*H04L 29/06* (2006.01)
*G06F 21/10* (2013.01)
(Continued)

(52) U.S. Cl.
CPC .......... *G06F 21/10* (2013.01); *G06F 21/6209* (2013.01); *G06F 21/6272* (2013.01); *G06F 21/645* (2013.01); *H04L 9/0631* (2013.01); *H04L 9/3247* (2013.01); *H04L 63/0428* (2013.01); *H04L 63/0435* (2013.01); *G06F 2221/0724* (2013.01)

(58) Field of Classification Search
None
See application file for complete search history.

(56) References Cited

U.S. PATENT DOCUMENTS 7,359,881 B2 * 4/2008 Stefik .................. G06F 21/10
375/E7.009
7,434,048 B1 * 10/2008 Shapiro ............... G06F 21/6218
713/165

(Continued)

FOREIGN PATENT DOCUMENTS

EP 1555591 A2 7/2005

OTHER PUBLICATIONS

Anonymous: "Digital Signature—Wikipedia, the free encyclopedia" Dec. 1, 2014 (retrieved Feb. 10, 2016).
Feb. 19, 2016—International Search Report—PCT/GB2015/053661.

*Primary Examiner* — Amir Mehrmanesh
(74) *Attorney, Agent, or Firm* — Banner & Witcoff, Ltd.

(57) ABSTRACT

Systems and methods for controlling access to digital works are described herein, e.g., including receiving a request for a digital work from a requestor; retrieving the digital work from a repository; incorporating a digital signature throughout the digital work specific to a device, wherein the incorporated digital signature includes information identifying the device having the ability to access to the digital work; providing the identified device with a device key associated with the device; encrypting the digital work, wherein the digital work is decryptable using the device key and the identified device; and providing the requestor with the encrypted digital work.

15 Claims, 6 Drawing Sheets

(51) Int. Cl.
*G06F 21/62* (2013.01)
*G06F 21/64* (2013.01)
*H04L 9/06* (2006.01)
*H04L 9/32* (2006.01)

(56) References Cited

U.S. PATENT DOCUMENTS

| | | | |
|---|---|---|---|
| 8,001,612 B1* | 8/2011 | Wieder | G06F 21/10 726/28 |
| 8,739,308 B1 | 5/2014 | Roth et al. | |
| 2003/0007640 A1* | 1/2003 | Harada | G06F 21/10 380/270 |
| 2005/0021980 A1* | 1/2005 | Kanai | G06F 21/608 713/182 |
| 2008/0320600 A1 | 12/2008 | Pandiscia et al. | |
| 2010/0217987 A1* | 8/2010 | Shevade | G06F 21/6272 713/175 |
| 2014/0258732 A1* | 9/2014 | Roth | G06F 21/6218 713/189 |

* cited by examiner

SECURE DOCUMENT MANAGEMENT

CROSS-REFERENCE TO RELATED CASES

This application is a continuation of PCT Application No. PCT/GB2015/053661, filed Nov. 30, 2015, entitled "Secure Document Management", which itself claims priority to United Kingdom (GB) Application No. 1421672.5, filed Dec. 5, 2014, entitled "Secure Document Management", each of which is herein incorporated by reference in its entirety for all purposes.

FIELD

Aspects described herein relate to a system and method for controlling access to documents and other digital works.

BACKGROUND

It is important for organisations and individuals to control their documents and other digital works. For some industries this may be a legal requirement. Computer implemented document management systems (DMS) provide document storage, tracking, backup, security, update histories and access control of documents and other digital works such as software code, audio and video files.

A DMS may store each document or other digital asset in its native format so that it may be created and edited by a particular software package (e.g. a word processor). However, instead of local or network storage of the document, a dedicated data store is used. Whilst each item or document may be stored securely or even encrypted, once a document has been retrieved by an author or editor it can be relatively simple to forward the document on to another party outside of the DMS. For example, a text document may be retrieved from the DMS by a registered user and forwarded as an email attachment to a different user outside of the control of the DMS. Even if the recipient is entitled to access to the document, any updates or changes that they may make will be lost as they will be made to a copy outside of the definitive version stored within the DMS. If the recipient is not an authorised user then this can also represent a security breach.

Password protecting individual documents can be cumbersome and easy to defeat as the password protection may be removed before the file is sent or the password may be sent with the document itself.

Another method of securing documents is to prevent them from being opened or edited in their native format and instead accessed or browsed within a proprietary application that is part of or associated with the DMS. However, this can be inconvenient for the end users and require additional computing resources for the DMS to run this functionality.

Therefore, there is required a method and system that overcomes these problems.

SUMMARY

Files of documents or other digital works are stored within a file storage or repository. These may be in encrypted or unencrypted form. New files may also be created, copied, amended or deleted. However, access to the files is restricted. Particular files may be retrieved from the file storage and processed before they are sent to users (e.g. to work on or review). This processing adds material to the file (before sending it out to recipients) to enable access by particular users and/or devices and also to prevent access by unauthorised users and/or devices. The material will include a digital signature that identifies one or more authorised users and/or devices that are provided with access to the file. The digital signature may also include other information. The user and/or device may have or be provided with cryptographic material that is used to decrypt the file (e.g. a device key). However, the cryptographic material can only decrypt files that include a digital signature that identifies or is otherwise associated with the particular user and/or device used to carry out the decryption. In other words, the cryptographic material can only decrypt a file on a particular device and this restriction may be maintained using the digital signature incorporated within or throughout the file. For example, the device key may be used to decrypt a portion of the digital signature that contains a further key (either symmetric or asymmetric) that may be used to decrypt the file or used to generate or decrypt a further key to do so. Therefore, only one (or a limited group) of devices may be able to decrypt the file because digital signature binds this decryption ability to a particular device.

According to one aspect, there is provided a method for controlling access to digital works, the method comprising the steps of: receiving a request for a digital work from a requestor; retrieving the digital work from a repository; incorporating a digital signature throughout the digital work specific to a device, wherein the incorporated digital signature includes information identifying the device having the ability to access to the digital work; providing the identified device with a device key associated with the device; encrypting the digital work, wherein the digital work is decryptable using the device key and the identified device; and providing the requestor with the encrypted digital work. Therefore, access to files may be restricted one or a group of devices. If the encrypted digital work is forwarded on to a device that is not identified (or otherwise associated with) within the signature then it doesn't have all of the cryptographic material necessary to successfully decrypt the digital work (even if it has the device key or its own device key). Some devices may be able to access certain digital works but not others. The digital signature may be used to enable or disable particular devices (e.g. through keys within those devices).

Preferably, the digital signature may enable decryption of the digital work on the device in conjunction with the device key.

Advantageously, the digital signature may be incorporated throughout the digital work further identifies the requestor. This may further restrict access. For example, the user and/or device may also be checked before decryption. This may use different keys, passwords, or other security measures.

Preferably, the digital signature incorporated throughout the digital work may be encrypted.

Optionally, the encryption may be AES encryption. For example, this may be 256 AES or other encryption standards.

Optionally, the digital signature incorporated throughout the digital work may be verifiable by a key different to the device key. For example, a certificate authority may be used.

Optionally, providing the identified device with a device key may include the step of generating the device key with the identified device. The key may also be generated or obtained from elsewhere. The device key may only be used in conjunction with information or other key material within the digital signature.

Optionally, the method may further comprise the step of incorporating into the digital signature at least one access date of the digital work. This may assist with auditing. The dates may be cumulative and be retained, to provide an audit trail, for example.

Optionally, the digital work may be: a document, a word processing document, an image, a file, an audio recording, software code or a presentation. Other types of files may be used and distributed and protected, in this way.

According to a second aspect, there is provided a method for accessing a digital work comprising the steps of: obtaining an encrypted digital work from a repository by a device, wherein a digital signature specific to the device is incorporated throughout the digital work and the digital signature includes information identifying the device having the ability to access to the digital work; and decrypting the digital work by the identified device using a device key, wherein decryption of the digital work is restricted to the identified device.

Preferably, the decrypting step may use the device key in conjunction with the digital signature to decrypt the digital work within the identified device.

According to a third aspect, there is provided a digital work management system comprising: one or more processors; a digital work repository; and at least one memory for storing computer executable instructions, wherein execution of the computer executable instructions by the at least one processor causes the system to: receive a request for a digital work from a requestor; retrieve the digital work from a repository; incorporate a digital signature throughout the digital work specific to a device, wherein the incorporated digital signature includes information identifying the device having the ability to access to the digital work; provide the identified device with a device key associated with the device; encrypt the digital work, wherein the digital work is decryptable using the device key and the identified device; and provide the requestor with the encrypted digital work.

Preferably, the digital work management system may further comprise one or more agents executing on one or more devices remote from the one or more processors, wherein each agent is configured to: obtain an encrypted digital work from the repository; and decrypt the digital work by the identified device using a device key, wherein the decrypted digital work includes a digital signature identifying the device executing the agent.

Optionally, the identified device may be: a smartphone, a desktop computer, a portable computer, a tablet computer or any other device.

Against this background and in accordance with a first aspect there is provided a weather prediction and forecasting system and method.

The methods described above may be implemented as a computer program comprising program instructions to operate a computer. The computer program may be stored on a computer-readable medium.

The computer system may include a processor such as a central processing unit (CPU). The processor may execute logic in the form of a software program. The computer system may include a memory including volatile and non-volatile storage medium. A computer-readable medium may be included to store the logic or program instructions. The different parts of the system may be connected using a network (e.g. wireless networks and wired networks). The computer system may include one or more interfaces. The computer system may contain a suitable operating system such as UNIX, Windows® or Linux, for example.

It should be noted that any feature described above may be used with any particular aspect or embodiment described herein.

BRIEF DESCRIPTION OF THE FIGURES

Aspects described herein may be put into practice in a number of ways and embodiments will now be described by way of example only and with reference to the accompanying drawings, in which.

It should be noted that the figures are illustrated for simplicity and are not necessarily drawn to scale. Like features are provided with the same reference numerals.

DETAILED DESCRIPTION

Over the past several decades document management system (DMS) servers have managed and controlled documents and other information. However, with the rise of smartphones and public document stores such as Dropbox® and Google® drive, the controls that DMS has imposed have started to be eradicated as users download and edit files away from their office PC.

The present system and method provides document level security technology to help to maintain the document integrity and also to help secure files and other digital works. This system may not prevent individuals from opening a file on a verified or secured device and then 'copying and pasting' that file to another device (e.g. unsecured device), in the same way that music and video DRM (Digital Rights Management) are unable to stop an individual filming or recording a given video or music file. However, it may restrict the original file and its contents from being opened on an unauthorized device, and as such may improve the maintenance of not only the integrity of the file, but also the legality of said file, as it can help to prove that the original and legal file had never been sent to a third party.

Figure 1:
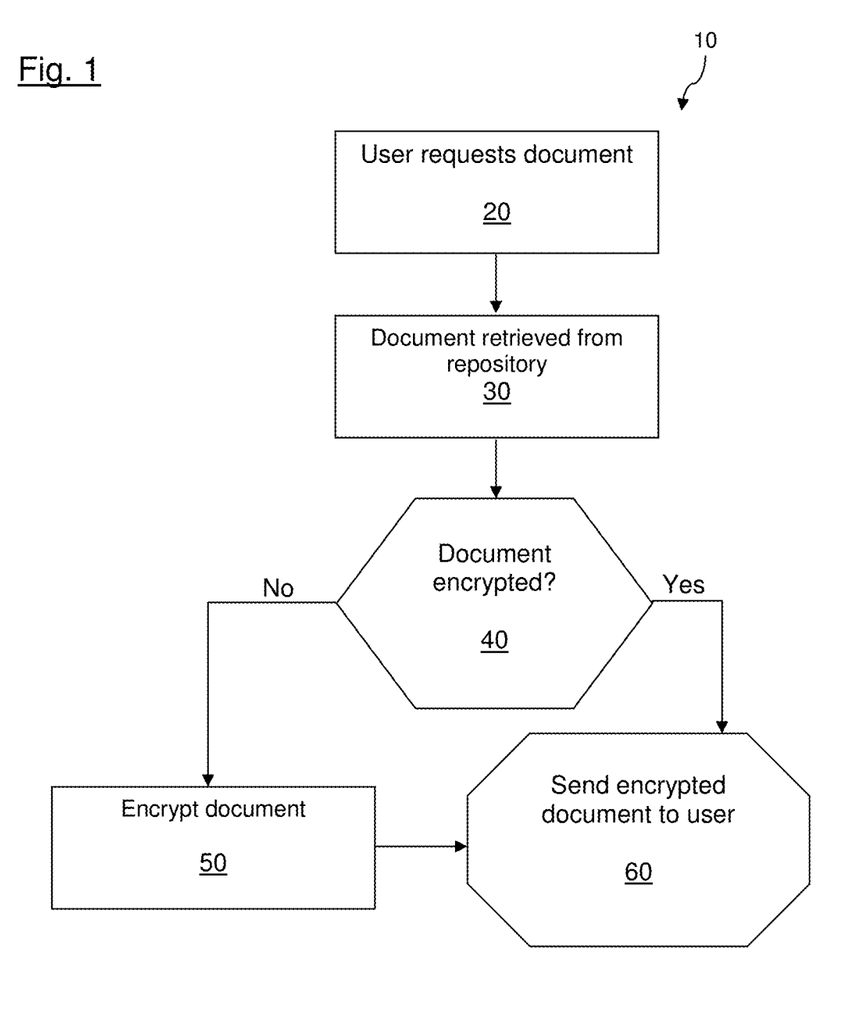
FIG. 1 shows a flowchart of a method for securely managing digital works.

FIG. 1 shows a flowchart of a method 10 for controlling access to digital works including documents. A user requests a particular document or documents from the system at step 20. This request may be an explicit request for a document or may come from a user browsing the contents of a repository or file store and attempting to open a particular document, for example. At step 30, the document is retrieved by the system from the repository, which may be a database or other data store. The documents stored within the repository may or may not be encrypted and so at step 40 the system determines whether or not the particular requested file has already been encrypted. If the file has been encrypted, then it is sent to the user that requested the document at step 60. However, if the document has not been encrypted, then this is carried out at step 50 before sending the document to the user. The request may include an identifier or other way to identify the user and/or requesting device.

Either as part of the encryption step 50 or separate from this step, a digital signature is incorporated throughout the digital work before being sent to the requestor. This digital signature contains a reference to or otherwise identifies a particular device or devices that are able to decrypt the encrypted digital work. This may be achieved in a number of ways. For example, a system key may be used to encrypt all digital works. The system key may be a symmetric key (or asymmetric key). This symmetric key may be itself encrypted and included in this signature using an asymmetric key. This asymmetric key may be a public key with a corresponding private key with the private key held only be a particular device (the request for the document may include the device's public key). Therefore, only that particular device can decrypt the encrypted system key and therefore decrypt the digital work or document. Additional safeguards may be put in place to prevent the system key from being reused such as only decrypting the system key within a secured area of the client device.

Therefore, should the user wish to view and edit the document then they are free to do so using their verified or secured device that is identified or otherwise associated with the digital signature distributed throughout the secured document. However, should the user of that secure device forward on the document to a different device that is not identified within the digital signature then the unverified recipient is unable to decrypt the file.

In a simplified example, a key to decrypt the document is sent directly to the device and a software agent or program on the device will only decrypt the document using the key if the signature within the file matches or otherwise corresponds with the device that is running the software agent or program. The file and key may be sent to another device but the software agent or program will determine that the device is not identifiable from the digital signature within the file and so will not decrypt the file.

Figure 2:
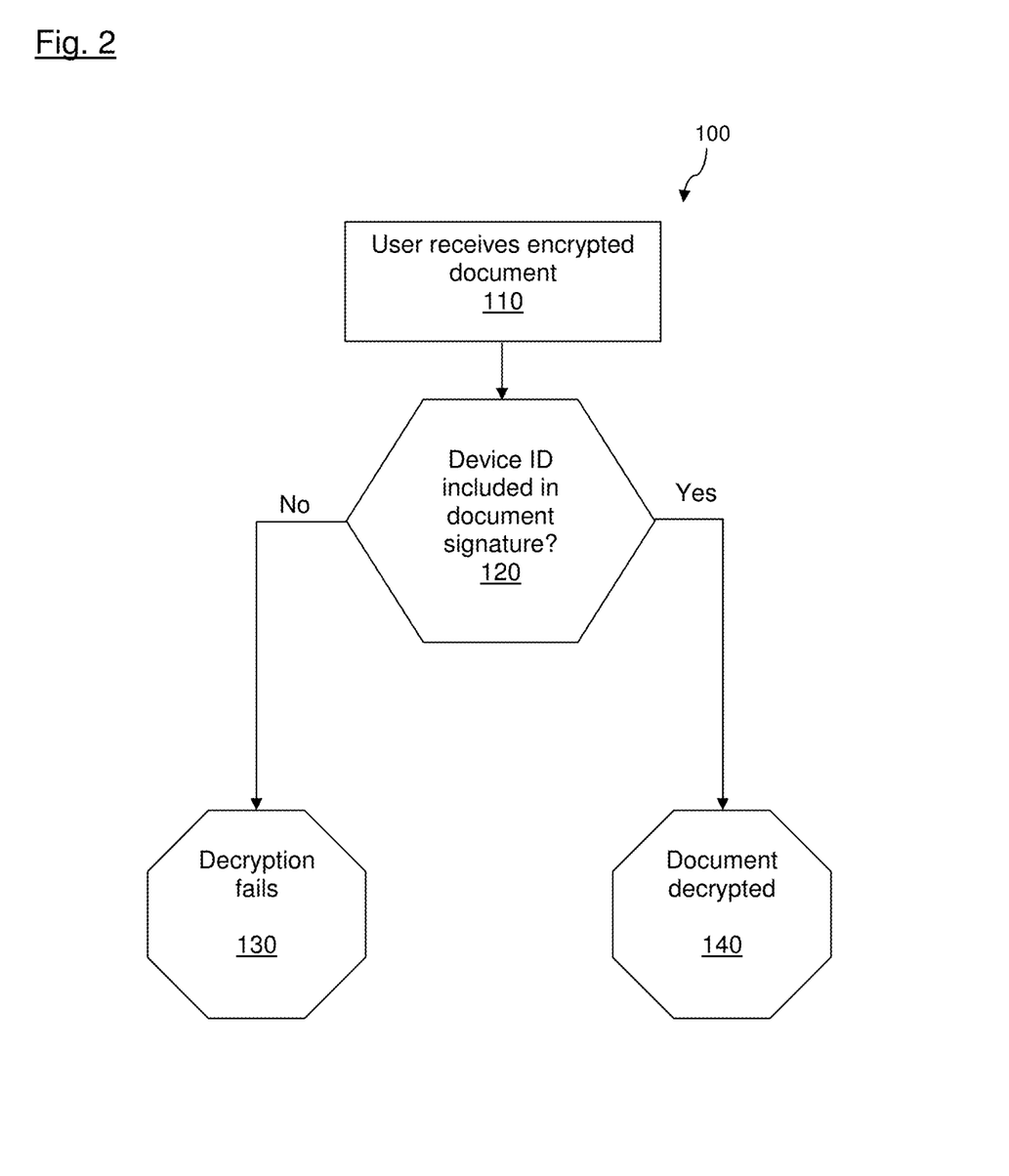
FIG. 2 shows a flowchart of a method of a user receiving a secured document.

FIG. 2 shows a flowchart of a method 100 for a user working on the documents secured using the method 10 described with reference to FIG. 1. The user receives the encrypted document or file at step 110. At step 120 an agent, application or other software operating on the user's device looks for the digital signature incorporated throughout the secured document. This agent determines whether the digital signature includes an identifier, or other cryptographic material associated the particular device or data stored within that device, to enable the agent to decrypt the document. If no such identifier or material is found then decryption fails at step 130 (either because insufficient information is available to carry out the decryption or because the agent detects such a deficiency). If necessary material or identifiers are found within the document signature then the document is decrypted successfully at step 140.

Figure 3:
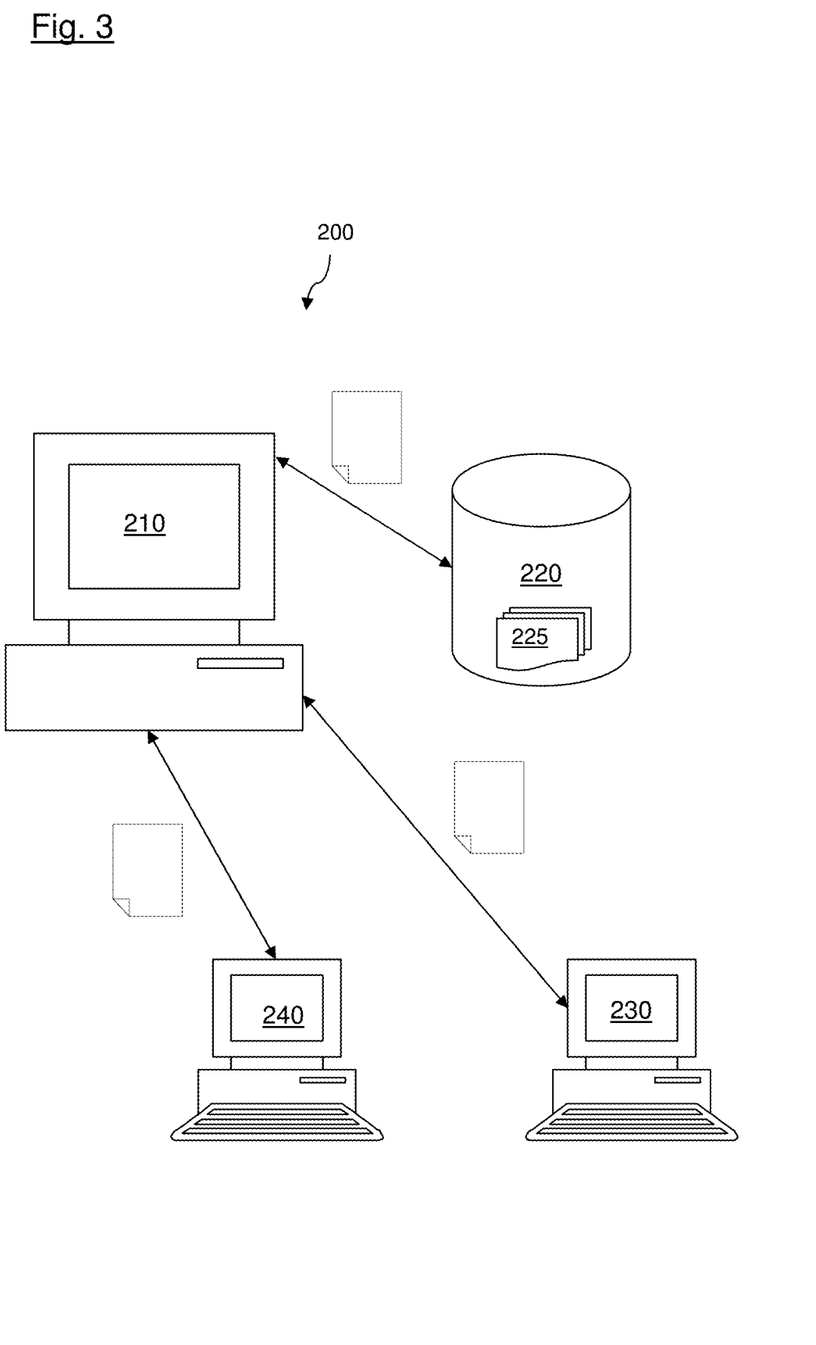
FIG. 3 shows a schematic diagram of a system for securing digital works.

FIG. 3 shows a schematic diagram of a system used to carry out the methods 10, 100 described with reference to FIGS. 1 and 2. The system includes a server 210 executing the document management system (DMS), which either incorporates a database 220 or is in communication with such a database 220 that stores a plurality of digital works or documents 225. FIG. 3 shows two devices 230, 240 that may be personal computers, desktop computers, laptop computers, tablet computers, smartphones or any other device or portable devices. These devices may create documents to be stored within the database 220 or request them from the server 210, which secures them according to the method 10 described above. Although two devices are shown in FIG. 3, any number of devices may be used to request, work on, edit or create documents to be secured by the system 200.

Figure 4:
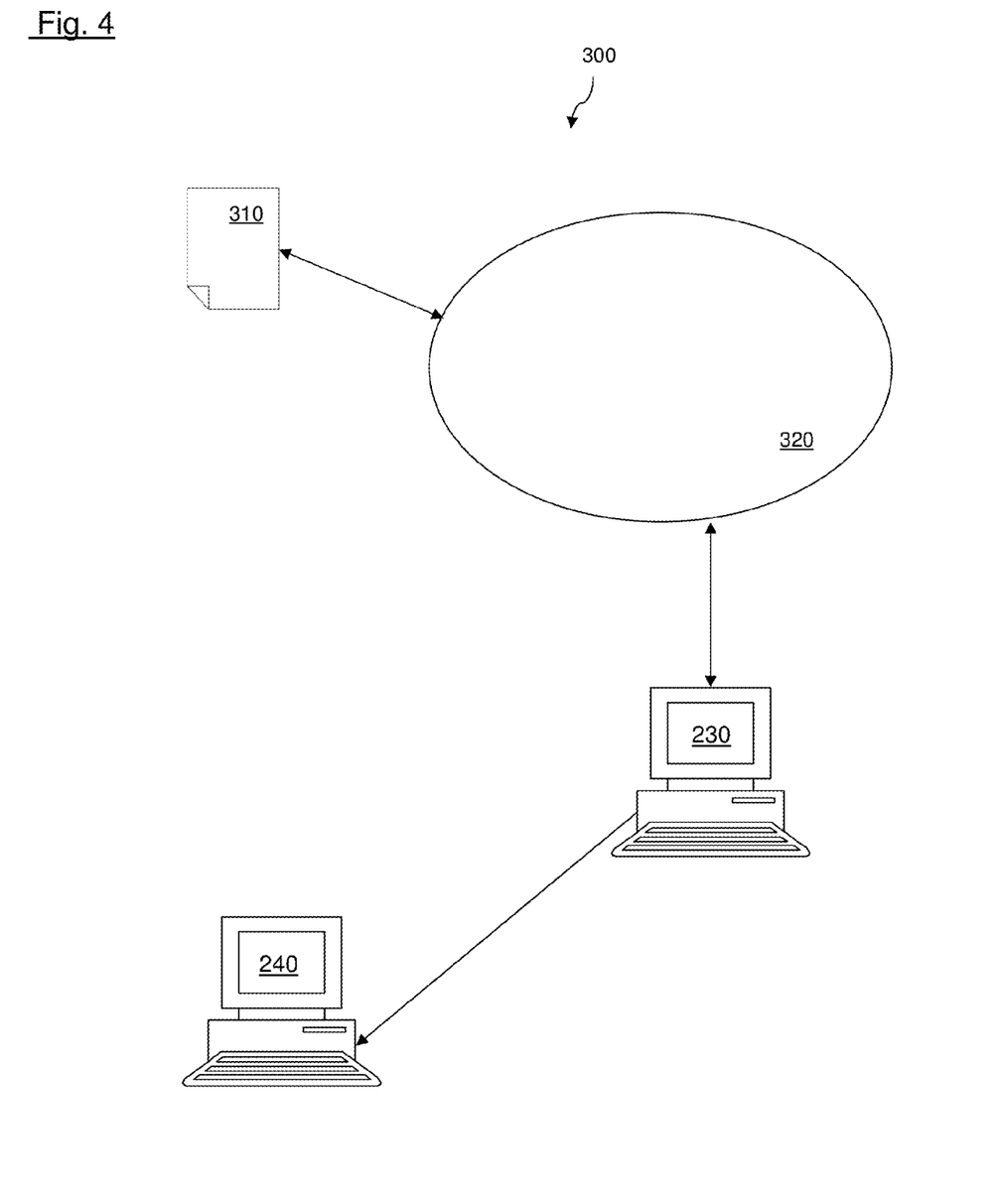
FIG. 4 shows a schematic diagram of a system communicating secured documents.

FIG. 4 illustrates schematically how the system 300 controls and transmits documents between the DMS 320 and various requesting devices 230, 240. The DMS 320 may control document access, sharing and editing privileges for individual documents 310 stored within its database 220. Users only have access to each document or digital work via the DMS, which only provides encrypted documents 310 to each requestor. When a user accesses a document or requests a document (or file) 310, then it is signed and sealed with a unique device specific identifier that only allows access to the particular file from that individual referenced device, which may have a unique identifier or store a particular unique key. Software agents running on each device 230, 240 enable the decryption (an encryption) of documents. The arrow between the device 230 and the device 240, which may or may not a verified device running a similar agent, indicates a transfer of a document outside of the control of the DMS 320. Even if the device 240 did have its own agent running with its own device key, then receiving the document 310 from another device 230 rather than directly from a document management system 320 will render the document useless as it cannot be decrypted by that recipient device 240. In other words, only users that request documents directly from the document management system 320 (and that are authorised or otherwise verified) can decrypt individual files. This is because the digital signature incorporated throughout the document are specific to the requesting device and will only enable decryption of that document 310 on that particular device 230.

Figure 5:
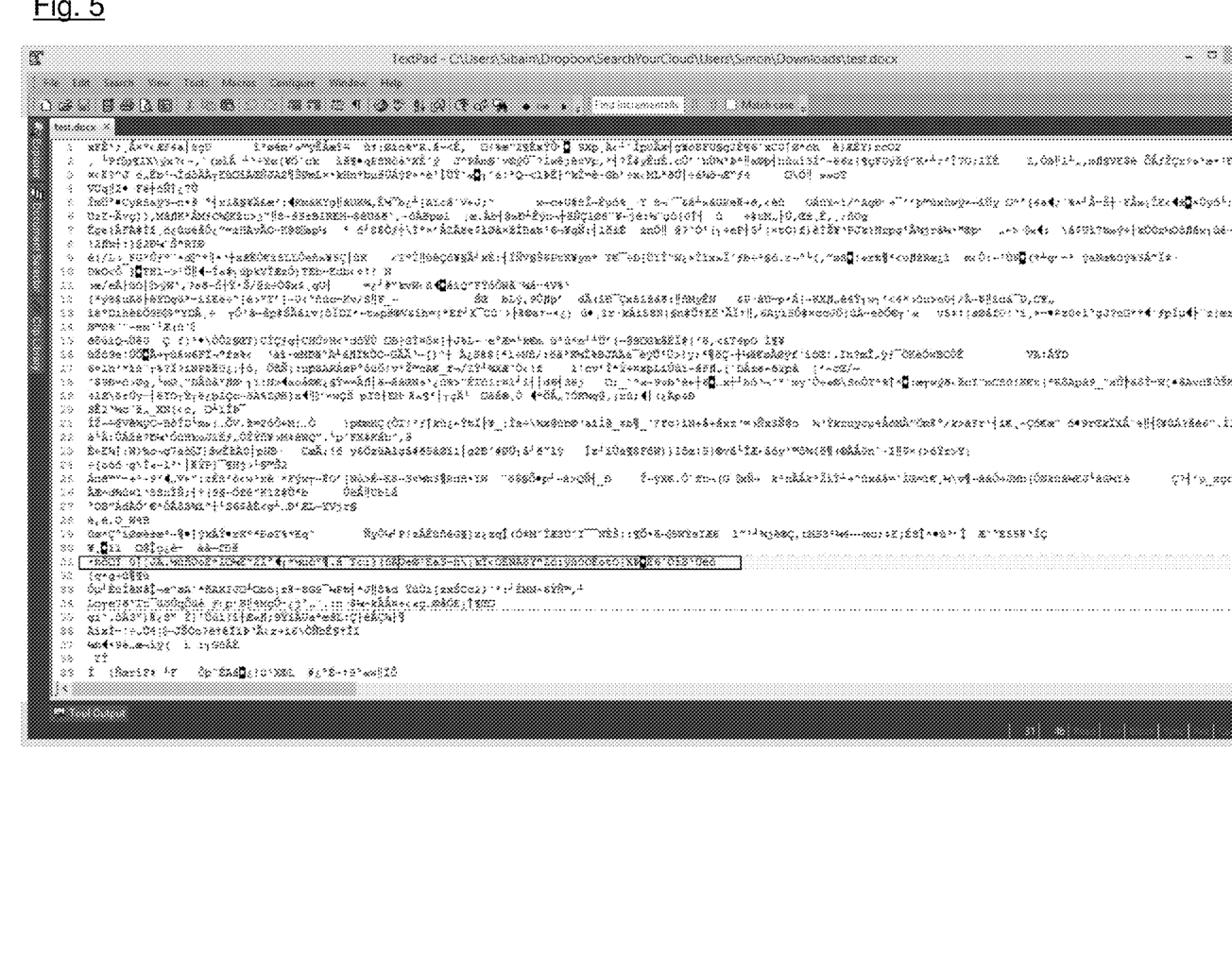
FIG. 5 shows a screenshot illustrating the contents of a secured document.

FIG. 5 shows a screenshot illustrating the contents of a digital work or document encrypted and digitally signed according to the method 10 described with reference to FIG. 1. As can be seen from this figure, the content of the document has been encrypted. The rectangular box on row 31 indicates the location of the digital signature specific to or providing access only to a single device. This digital signature may be scattered (whole or in portions) throughout the file and may be set to be only visible to the agent running on the requesting device 230, 240.

Figure 6:
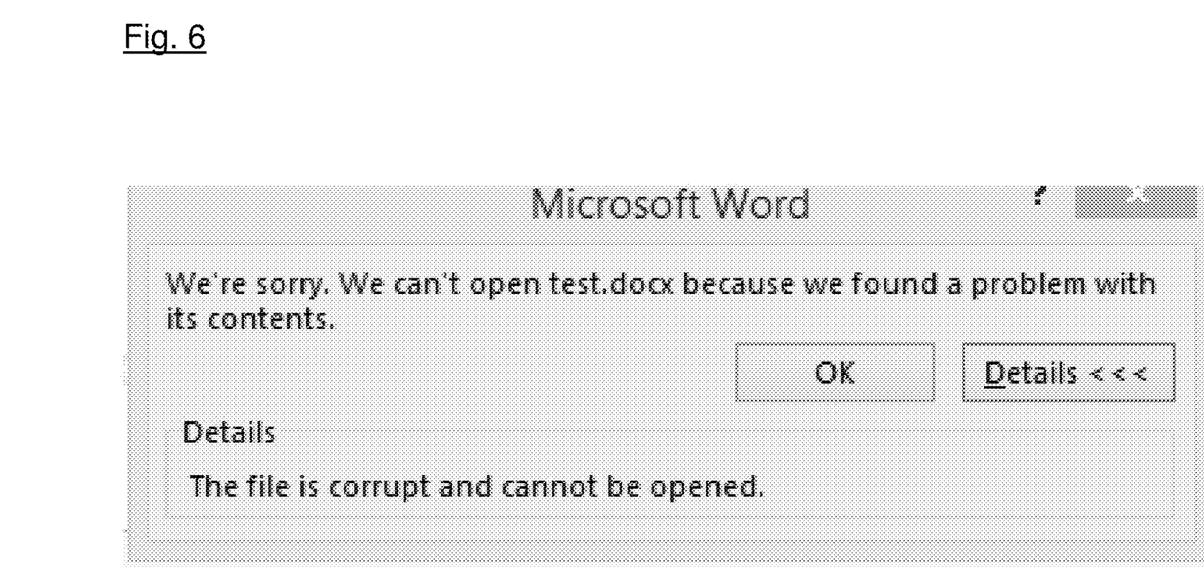
FIG. 6 shows a screenshot of an error message from a word processing package attempting to open the secured document of FIG. 5 using an unverified device.

FIG. 6 illustrates a screenshot of a word processing package indicating that the document (received from another device) cannot be opened. The device running the software and attempting to open the document is not an authorised device or is not associated with or identified within the digital signature within the document.

The DMS 320 may operate according to the following steps or stages.

1. A file (document or digital work) resides on a DMS (e.g. within database 220).

2. A user logs in to the DMS 320 and request access to the file from the DMS 320.

3. This call may be intercepted and adds the hidden digital signature to the file 310.
 a. This signature may comprise:
  i. Access Date—Used for audit;
  ii. User Details—(non-validating) used for audit; and
  iii. User access device—used to lock the file to that one device.
 b. If the file is not already encrypted it will be done at this time.

4. User opens the file on their device without having to know about the document level security.

5. User emails file to a colleague (i.e. attempts to circumvent the documents controls).

6. Colleague opens the file on their device.

7. A message is displayed within the application used to open the file saying that the contents are not readable and possibly that the file is corrupted. This may occur whether or not they are using software agent.

The encryption of the document may be carried out using a private key and to AES 256 levels. The signature is also AES 256 but preferably with a different key and it is not appended or pre-pended to the document. The signature is scattered throughout the documents contents, making it as nearly impossible as practical to find and circumnavigate.

As will be appreciated by the skilled person, details of the above embodiment may be varied without departing from the scope of the present disclosure.

For example, may different types of digital works may be stored and secured in this way. These may include software code, technical documents, text documents, audio files, video files, distributed files (e.g. films, music, games) or images. Other digital rights management restrictions or usage rights may be applied separately or as part as the procedure. Rather than a single device being referenced, identified or otherwise associated with the digital signature, more than one device may be included or multiple digital signatures may be incorporated into the file.

The DMS may be an existing DMS with further functionality added (e.g. using plugins or other additional software). Example DMSs may be include OpenText or MS SharePoint. The digital signature may be built when the DMS receives the request. The request may include details of the requesting device (e.g. a unique identifier or public key). The file may be sent to the requesting device wherein the digital signature is checked and the file is decrypted using a key that is only available once and only on that device. This key may be sent to the device or stored within it in advance, for example. The key may be sent to the device securely (e.g. using Diffie Hellman communication protocols). Users can create new documents on their device, which are stored in the DMS in the usual way. It is only when a document is requested that the encryption and decryption scheme occurs.

In some implementations, the encryption on the file may change each time a file is requested, even if it requested multiple times by the same device.

The device key may be generated by the device, received by the device from the server or generated by another entity.

Many combinations, modifications, or alterations to the features of the above embodiments will be readily apparent to the skilled person and are intended to form part of the disclosure made herein. Any of the features described specifically relating to one embodiment, aspect or example may be used in any other embodiment, aspect or example by making the appropriate changes.

What is claimed is:

1. A method for controlling access to digital works, the method comprising:
   receiving a request for a digital work from a requestor; and
   in response to receiving the request for the digital work:
      retrieving the digital work from a repository;
      incorporating a digital signature throughout the digital work specific to a first device, wherein the incorporated digital signature includes information identifying the device having the ability to access to the digital work, and wherein the digital signature comprises a signature key;
      encrypting a portion of the digital signature based on a first device key associated with the first device, wherein the portion of the digital signature is less than the entire digital signature and comprises the signature key;
      encrypting the digital work based on the first device key and the signature key, wherein the digital work is decryptable by the first device using the first device key to decrypt the portion of the digital signature comprising the signature key, and using the signature key and the first device key to decrypt the digital work; and
      providing the requestor with the encrypted digital work.

2. The method of claim 1, wherein the digital signature incorporated throughout the digital work further identifies the requestor.

3. The method of claim 1, wherein the encryption comprises AES encryption.

4. The method of claim 1, wherein the digital signature incorporated throughout the digital work is verifiable by a key different to the first device key.

5. The method according to claim 1, wherein providing the first device with the first device key comprises generating the first device key with the identified device.

6. The method according to claim 1 further comprising incorporating in to the digital signature at least one access date of the digital work.

7. The method according to claim 1, wherein the digital work comprises one or more of: a document, a word processing document, an image, a file, an audio recording or a presentation.

8. A digital work management system comprising:
   one or more processors;
   a digital work repository; and
   at least one memory for storing computer executable instructions, wherein execution of the computer executable instructions by the at least one processor causes the system to:
      receive a request for a digital work from a requestor; and
      in response to receiving the request for the digital work:
         retrieve the digital work from a repository;
         incorporate a digital signature throughout the digital work specific to a first device, wherein the incorporated digital signature includes information identifying the first device having the ability to access to the digital work, and wherein the digital signature comprises a signature key;
         encrypt a portion of the digital signature based on a first device key associated with the first device, wherein the portion of the digital signature is less than the entire digital signature and comprises the signature key;
         encrypt the digital work based on the first device key and the signature key, wherein the digital work is decryptable by the first device using the first device key to decrypt the portion of the digital signature comprising the signature key, and using the signature key and the first device key to decrypt the digital work; and
         provide the requestor with the encrypted digital work.

9. The digital work management system of claim 8, wherein the identified device comprises: a smartphone, a desktop computer, a portable computer or a tablet computer.

10. One or more non-transitory computer readable media storing computer readable instructions that, when executed, cause an apparatus to:
   receive a request for a digital work from a requestor; and
   in response to receiving the request for the digital work:
      retrieve the digital work from a repository;
      incorporate a digital signature throughout the digital work specific to a device, wherein the incorporated digital signature includes information identifying the device having the ability to access to the digital work, and wherein the digital signature comprises a signature key;

encrypt a portion of the digital signature based on a first device key associated with the first device, wherein the portion of the digital signature is less than the entire digital signature and comprises the signature key;

encrypt the digital work based on the first device key and the signature key, wherein the digital work is decryptable by the first device using the first device key to decrypt the portion of the digital signature comprising the signature key, and using the signature key and the first device key to decrypt the digital work; and provide the requestor with the encrypted digital work.

11. The computer readable media of claim 10, wherein the digital signature incorporated throughout the digital work further identifies the requestor.

12. The computer readable media of claim 10, wherein the encryption is AES encryption.

13. The computer readable media of claim 10, wherein the digital signature incorporated throughout the digital work is verifiable by a key different to the first device key.

14. The computer readable media according to claim 10 further comprising incorporating in to the digital signature at least one access date of the digital work.

15. The computer readable media according to claim 10, wherein the digital work comprises: a document, a word processing document, an image, a file, an audio recording or a presentation.

* * * * *